United States Patent [19]
Muschio, III

[11] Patent Number: 5,518,537
[45] Date of Patent: May 21, 1996

[54] FILLER AND WAX COMPOSITION FOR INVESTMENT CASTING

[75] Inventor: Henry M. Muschio, III, Wingdale, N.Y.

[73] Assignee: M. Argüeso & Co., Inc., Mamaroneck, N.Y.

[21] Appl. No.: 404,305

[22] Filed: Mar. 14, 1995

[51] Int. Cl.$^6$ ............... C09D 101/12; C09D 191/06; C09D 191/08; B29C 33/40
[52] U.S. Cl. ............................. 106/191; 264/227
[58] Field of Search ............................. 264/227; 106/191

[56] References Cited

U.S. PATENT DOCUMENTS

| | | | |
|---|---|---|---|
| 3,183,197 | 5/1965 | Richardson et al. | 106/191 |
| 3,414,421 | 12/1968 | Robinson | 106/191 |
| 4,046,579 | 9/1977 | Martin | 106/38.8 |
| 4,094,695 | 6/1978 | Sanders | 106/191 |
| 4,396,731 | 8/1983 | Dawans et al. | 106/191 |
| 5,006,583 | 4/1991 | Argueso | 524/277 |
| 5,372,768 | 12/1994 | Solomon | 264/221 |

*Primary Examiner*—David Brunsman
*Attorney, Agent, or Firm*—Parmelee, Bollinger & Bramblett; George W. Rauchfuss, Jr.

[57] ABSTRACT

Thermoplastic resin powders of cellulose acetate esters in which essentially 80% or more of the particles pass through a 100 mesh screen (U.S. Sieve Series) and essentially 50% pass through a 200 mesh screen (U.S. Sieve Series) are desirable and useful as a filler material for investment casting waxes. The cellulosic thermoplastics resin powders are environmentally safe when used as filler material for investment casting wax compositions since the powders produce essentially no carcinogenic materials on combustion. The powders are as effective as acid fillers and set relatively fast thus improving cycle time in the die but do not produce an adverse effect of shell cracking nor react with the slurry.

20 Claims, No Drawings

FILLER AND WAX COMPOSITION FOR INVESTMENT CASTING

FIELD OF THE INVENTION

This invention relates to wax compositions for investment casting and to the use of such compositions for investment casting. More particularly, this invention relates to a filler for wax compositions for investment casting and to wax compositions containing such filler.

BACKGROUND OF THE INVENTION

Since very ancient times, going back at least to the Shang Dynasty in China, the so-called "lost-wax" process has been employed for the manufacture of castings. Essentially, this process comprises forming a pattern of wax or blends of various suitable waxes and resins. This finished pattern is then invested with a suitable medium, such as a ceramic or refractory slurry, which is then solidified and becomes a mold around the wax pattern. The pattern material or more commonly the wax is then removed from the mold by melting it and/or by burning, and a molten metal is poured into the now empty mold to produce the finished part. Further descriptions of investment casting are found in U.S. Pat. Nos. 3,263,286 and 3,667,979, as well as in the Investment Casting Handbook of the Investment Casting Institute, 1968.

Such a process has many obvious advantages for making parts, especially intricate parts, which cannot be made, for example, by machining. However, the properties of the casting waxes are extremely important for the production of such parts in modern day usage of this process.

A summary of some of the requisite physical properties of such pattern materials is found in the British publication entitled "PATTERN MATERIALS AND THEIR USE IN INVESTMENT CASTING" of the Pattern-Making Committee of the B.I.C.T.A.

One of the major drawbacks in the use of investment casting wax compositions is that conventionally the wax must be injected at temperatures somewhat above room temperature, i.e. 105° F. to 190° F. Waxes are non-Newtonian fluids so that when injected under pressure, they are subjected to shearing forces causing them to become somewhat more fluid. It is not necessary to heat waxes until they are completely liquid in order to completely fill the interstices of a die; nevertheless, they must be heated to some extent. Thus, when injected into a complicated die, thin wax sections cool relatively quickly, reproducing that particular section with a high degree of dimensional accuracy, but the wax in heavier sections will shrink considerably more. Additionally, because of these different rates of cooling and shrinkage, considerable stress can be imposed on the wax pattern, and when removed from the die, the pattern may readily distort in order to relieve the strain.

To a limited extent, such dimensional problems can be compensated for by retooling of the master die. Such retooling is a complicated procedure at best, and in addition, such a tailoring of a die is costly and is not completely reliable. Moreover, heating up of the die with repeated injections, large ambient temperature variations and the like, all further combine to produce a considerable loss of precision in the mass reproduction of pattern dimensions.

This problem in investment casting caused by distortion of the patterns due to shrinkage has long troubled the art. Solution of this problem has been attempted by inclusion of various filler materials in the investment casting wax composition. While this feature has met with some degree of success, it has also introduced some new problems as well as leaving other problems unsolved.

For one thing, the wax composition must be safe to handle as a solid and must be capable of convenient melting or burning out of a mold. It is also essential that the wax composition have a low ash content; that is, less than about 0.1%, preferably about 0.02% by weight or less when burned. It is also necessary that such wax compositions be of sufficient strength and be hard enough at room temperature, so that the patterns be self-supporting and can be handled without damage.

Among the various materials that have been suggested as useful filler for such investment casting wax compositions but which have not met all the desirable physical properties for pattern making or have resulted in new problems there may be mentioned that polystyrene beads can be used as suggested by U.S. Pat. No. 3,465,808, or polystyrene cross-linked with divinyl-benzene, or urea powder. However, during autoclave removal of the wax, the wax melts out first leaving a polystyrene residue that tends to tear the ceramic mold wall.

Moreover, there is an excessive breakage of these ceramic shells, such that they become unsuitable for use as molds for receiving molten metal. This recent occurrence of excessive shell mold breakage occurs during the dewaxing of ceramic shells.

Also, it has been further suggested that organic acids, such as fumaric acid, adipic acid or isophthalic or terephthalic acid be employed as fillers. However, said acid fillers undesirably attack acid sensitive ceramic materials in shells used for high quality metal castings.

Moreover, such fillers suffer additional drawbacks. For example, urea tends to decompose when the wax is melted and organic acids have high specific gravities and thus tend to settle quickly when not sufficiently agitated. Many fillers have a relatively high thermal conductivity which can lead to premature expansion of the investment casting wax composition upon autoclaving and thereby causing shell cracking. Additionally, many such fillers can produce environmentally hazardous or carcinogenic materials upon combustion.

It would therefore be desirable to provide material useful as a filler in investment casting wax compositions which upon combustion does not produce environmentally hazardous or carcinogenic materials yet has the desirable characteristics and properties of previously used filler materials.

SUMMARY OF THE INVENTION

Thermoplastic cellulosic acetate resin powders in which essentially 80% or more of the particles pass through a 100 mesh screen (U.S. Sieve Series) and essentially 50% pass through a 200 mesh screen (U.S. Sieve Series) have been found to be especially useful as a filler material for investment casting waxes.

DETAILS OF THE INVENTION

It has been discovered that highly useful and desirably relatively low cost particles of cellulosic resins powder particles in which at least about 80% of the powder particles pass through a 100 mesh screen and at least about 50% pass through a 200 mesh screen are especially suitable for use as fillers in investment casting of wax compositions. The cellulosic resin powder is a cellulose acetate ester or mixed ester resin such as cellulose acetate, cellulose acetate propionate, cellulose acetate butyrate and cellulose acetate phthalate and the like. Preferred are cellulose acetate resin containing up to 45 wt. % acetyl, cellulose acetate propionate containing up to 45 wt. % acetyl and up to 52 wt. % propionyl, cellulose acetate butyrate containing up to 45 wt. % acetyl and up to 58 wt. % butyryl and cellulose acetate phthalate containing up to 40 wt. % combined phthalyl and up to 30 wt. % combined acetyl. Especially preferred is a cellulose acetate resin powder having a specific gravity of about 1.31–1.32. The cellulose acetate resin filler can be utilized in the investment casting wax compositions as the sole filler or can, if desired, be combined with other investment casting wax fillers. That is, the cellulose acetate filler may comprise from about 5 to 100% by weight of the total filler employed in the composition.

In accordance with this invention, the cellulose thermoplastic resin powder particles of this invention in which about 80% by weight pass through a 100 mesh screen and about 50% by weight pass through a 200 mesh screen are especially suitable for use as a filler for investment casting wax composition. The particles are incorporated in an amount of from about 5 to about 75%, preferably from about 10 to about 55%, and more preferably from about 15 to about 45% and most preferably from about 15 to about 25%, by weight into a base wax composition suitable for use in investment casting and particularly for use as a pattern wax.

The wax composition of the present invention thus contains the cellulosic resin particles in any suitable base wax composition. The wax generally constitutes from about 25 to 95% by weight, more generally from about 45 to 90%, more preferably from about 55 to 85%, and most preferably from about 75 to 85% by weight of the final composition.

Suitable base wax compositions can include petroleum waxes, natural vegetable or mineral waxes, synthetic waxes and various resinous materials derived from the refining of petroleum and wood resins, terpene-type resins or mixtures of these materials or any of those waxes disclosed in the prior art patents mentioned previously. The base wax compositions can thus contain one or more hydrocarbon materials or other organic materials having for instance, oxygen-containing groups, as in the case of stearic acid or abietic acid, or nitrogen-containing groups such as in the case of amides. The base wax compositions usually melt at temperature in the range of about 120° to about 200° F.

A suitable base wax consists essentially of 0 to 15% vegetable wax, 20 to 60% of petroleum wax consisting of mixtures of paraffin waxes having a melting point of from 120° to 160° F. and microcrystalline waxes having a melting point of from 135° to 205° F., 1 to 12% of synthetic waxes such as Fisher-Tropsch waxes, polyethylene, ethylene vinyl acetate, or amides, and about 13 to 70% of various resins, such as hydrocarbon resins, or resins derived from the refining of petroleum or of wood products, particularly those known as polyterpene resins. The preferred vegetable waxes are candelilla and carnauba waxes. These base waxes are well known in the art and, therefore, they need not be described further.

The final form of the wax composition containing the cellulosic resin powder particle filler can be in flake, slab or billet form or other suitable forms. Such compositions are of low ash content, generally below about 0.1%, preferably below about 0.02% by weight. Additionally, to be suitable as a wax for investment casting, the wax must be of sufficient hardness to form acceptable patterns with minimal shrinkage. Such particle containing investment casting waxes have a hardness based on the ASTM D-5 needle penetration test using the investment Casting Institute modification of a 450 gm total weight on the needle-point, of between 5 to 15 and possibly from 2 to 25 or 30 tenths of millimeters (dmm). This Investment casting Institute needle penetrometer testing procedure is described in the publication dated November 1971, entitled: Standard Material Specification for Pattern Materials by the Investment Casting Institute, in the section entitled: "Determination of Consistency-Needle Penetration Method".

The following specific examples are illustrative of the improved investment casting wax compositions of the present invention and their use.

EXAMPLE I

| 8.4 | weight percent | Carnauba wax |
| 42.0 | " | Aliphatic $C_5$ hydrocarbon resin, mp 115° C. (ASTM E-28) |
| 15.1 | " | Microcrystalline wax, mp 178° F. (ASTM D-127) |
| 14.3 | " | Paraffin wax, mp 145° F. (AMP) |
| 4.2 | " | Polyethylene, mp 222° F. (ASTM E-28) |
| 16.0 | " | Cellulose acetate particles. |
| 40.0 | weight percent | Polyterpene resin, mp 135° C. (ASTM E-28) |
| 21.6 | " | Paraffin wax, mp 155° F. (AMP) |
| 14.4 | " | Microcrystalline wax, mp 178° F. (ASTM D-127) |
| 4.0 | " | Polyethylene, mp 244–262° F. (ASTM D-566) |
| 20.0 | " | Cellulose acetate particles. |

The polyterpene resin has a specific gravity of 0.995 (25°/25° C.) and a ball and ring softening point of about 135° C.

EXAMPLE III

| 37.50 | weight percent | Polyterpene resin, mp 135° C. (ASTM E-28) |
| 20.25 | " | Paraffin wax, mp 155° F. (AMP) |
| 13.50 | " | Microcrystalline wax, mp 178° F. (ASTM D-127) |
| 3.75 | " | Polyethylene, mp 244–262° F. (ASTM D-566) |
| 25.00 | " | Cellulose acetate particles. |

EXAMPLE IV

| 30.94 | weight percent | Premium hydrogenated $C_5$, $C_9$ resin, mp 125° C. (ASTM E-28) |
| 22.75 | " | Paraffin wax, mp 145° F. (AMP) |
| 22.75 | " | Microcrystalline wax, mp 178° F. (ASTM D-127) |
| 9.10 | " | Candelilla wax |
| 4.55 | " | Montan wax |
| 0.91 | " | Paraflint H-1 (Synthetic paraffin wax) |
| 9.00 | " | Cellulose acetate particles. |

Completely acceptable patterns are made with the aforementioned wax compositions containing cellulose acetate resin powder particles as a filler according to known investment casting techniques.

In another aspect of this invention, a method of investment casting is provided wherein the cellulose acetate resin powder particle-containing wax compositions are utilized.

In such a process a low shrinkage, dimensionally stable, fast setting casting wax having cellulose acetate resin powder particles as a filler, such as those described in Examples I and III, is injected into a suitable die for making a wax pattern. The hardened wax pattern is removed from the die. The pattern or a cluster of such patterns is/are gated to a wax sprue. Then, the sprued pattern or patterns are utilized in either the solid mold investment casting process or the investment shell casting process.

In the solid mold investment casting process, the sprued pattern is invested in a mold slurry which is allowed to harden.

In the investment shell casting process, the sprued pattern is dipped in a slurry of finely divided ceramic material, and a refractory grain is then sifted onto the coating. After suitable drying time, this process of dipping and sifting is repeated several times to build up a desired shell thickness.

In any of the above processes, the cellulose acetate resin powder particle-containing wax composition is removed from the ceramic mold by melting in an oven, over a steam bath, or in an autoclave. The ceramic mold is then fired at high temperature to remove the last traces of the wax composition and to cure the ceramic mold itself. Molten metal is then poured into the ceramic mold and allowed to harden. The mold material is then broken away from the castings, the castings removed from the resultant metal sprue, and suitably finished. A more detailed description of these investment casting processes can be found in the Investment Casting Handbook referred to above.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. In an investment casting wax composition for use in an investment casting wax process, the improvement wherein particles of a cellulose acetate resin are present in the composition as a filler.

2. An investment casting wax composition according to claim 1 wherein at least about 80% by weight of the cellulose acetate resin particles pass through a 100 mesh screen and at least about 50% by weight of the particles pass through a 200 mesh screen.

3. An investment casting wax composition according to claim 2 wherein the cellulose acetate resin is cellulose acetate having a specific gravity of about 1.31 to 1.32.

4. An investment casting wax composition according to claim 3 wherein the cellulose acetate resin particles comprise from about 15 to about 25% by weight of the investment casting wax composition.

5. An investment casting wax composition according to claim 3 wherein the cellulose acetate resin particles comprise from about 5 to about 100% by weight of the total filler in the investment casting wax composition.

6. An investment casting wax composition according to claim 2 wherein the cellulose acetate resin powder particles comprise from about 5 to about 75% by weight of the investment casting wax composition.

7. An investment casting wax composition according to claim 2 wherein the cellulose acetate resin particles comprise from about 15 to about 25% by weight of the investment casting wax composition.

8. An investment casting wax composition according to claim 5 wherein the cellulose acetate resin particles comprise from about 5 to about 100% by weight of the total filler in the investment casting wax composition.

9. An investment casting wax composition according to claim 2 wherein the cellulose acetate resin particles comprise from about 5 to about 100% by weight of the total filler in the investment casting wax composition.

10. An investment casting wax composition according to claim 1 wherein the cellulose acetate resin particles comprise from about 5 to about 100% by weight of the total filler in the investment casting wax composition.

11. An investment casting wax composition for use in the investment casting wax process which consists essentially of a base wax composition melting in the range of 120° to 200° F. and, as a filler, about 10 to 55% by weight of the final composition of cellulose acetate resin powder particles wherein at least about 80% by weight of said particles pass through a 100 mesh screen and at least about 50% by weight passes through a 200 mesh screen, said wax composition having sufficient hardness to form acceptable patterns and said wax composition being dimensionally stable.

12. A composition of claim 11 wherein the base wax comprises about 0 to 15 wt. % vegetable wax, about 20 to 60 wt. % petroleum wax consisting of a mixture of paraffins having a melting point of from 120° to 160° F. and microcrystalline waxes having a melting point of from about 135° to 205° F., about 1 to 12 wt. % synthetic waxes and about 13 to 79 wt. % of resins selected from hydrocarbon resins and resins derived from the refining of petroleum or of wood products.

13. A composition of claim 12 wherein the vegetable wax is carnauba wax.

14. A composition of claim 12 wherein the vegetable wax is candelilla wax.

15. A low shrinkage, dimensionally stable investment casting wax composition having sufficient hardness to form acceptable patterns for use in the investment casting wax process which consists essentially of a base wax melting in the range of 120° to 200° F. and, as a filler, from about 5 to about 75% by weight of particles of a cellulose acetate resin powder particles wherein at least about 80% by weight of said particles pass through a 100 mesh screen and at least about 50% by weight passes through a 200 mesh screen.

16. An investment casting wax composition of claim 15 of the following composition: 37.50 weight percent of polyterpene resin having a specific gravity of 0.995 (25°/25° C.) and a ball and ring softening point of about 135° C.; 20.25 weight percent of paraffin wax having a softening point at about 155° F.; 13.50 weight percent of microcrystalline wax having a softening point at about 178° F.; 3.75 weight percent of polyethylene softening in the range of 244° to 262° F. and 25.00 weight percent of said cellulose acetate particle filler.

17. An investment casting wax composition of claim 15 of the following composition: 40 weight percent of polyterpene resin having a specific gravity of 0.995 (25°/25° C.) and a ball and ring softening point of about 135° C.; 21.6 weight percent of paraffin wax having a softening point at about 155° F.; 14.4 weight percent of microcrystalline wax having a softening point at about 178° F.; 4.0 weight percent of polyethylene softening in the range of 244° to 262° F. and 20.0 weight percent of said cellulose acetate particle filler.

18. An investment casting wax composition of claim 15 of the following composition: 30.95 weight percent of a hydrogenated $C_5$, $C_9$ resin; 22.75 weight percent of paraffin wax having a softening point of about 145 ° F.; 22.75 weight percent of microcrystalline wax having a softening point of about 178° F.; 9.10 weight percent of candelilla wax; 4.55 weight percent montan wax; 0.91 weight percent synthetic paraffin wax; and 9.0 weight percent of said particle filler.

19. An investment casting wax composition of claim 15 of the following composition: 8.4 weight percent carnauba wax, 15.1 weight percent microcrystalline wax having a softening point of about 178° F.; 14.3 weight percent paraffin wax having a softening point of about 145° F.; 4.2 weight percent of polyethylene having a softening point of about 222° F.; 42.0 weight percent of an aliphatic hydrocarbon resin having a softening point of about 115° C.; and 16.0 weight percent of said cellulose acetate particle filler.

20. A method for investment casting comprising:

(a) forming in a mold a thermoplastic pattern of an investment casting wax composition, said investment casting composition comprising a base wax composition and from about 5 to about 75% by weight, based on the weight of the base wax composition, of particles of a cellulose acetate resin powder particles as a filler; and (b) investing said pattern to form a east.

* * * * *